Nov. 5, 1940.　　　　　J. MAGA　　　　　2,220,342
LAWN TOOL
Filed July 31, 1939
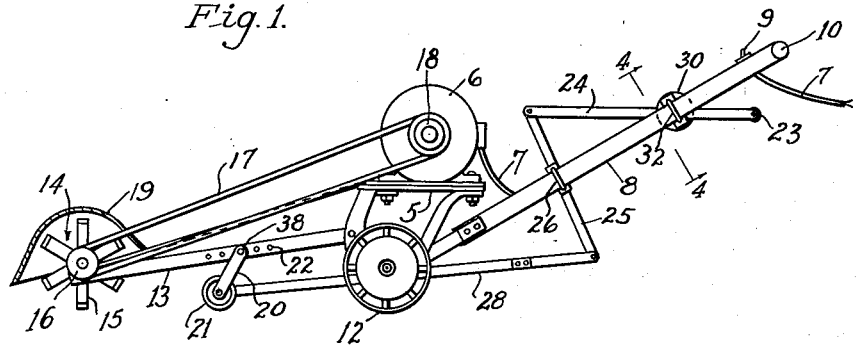
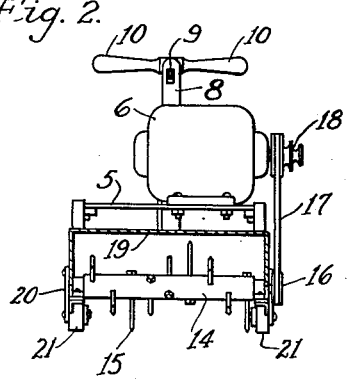
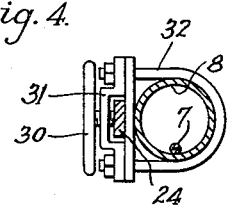
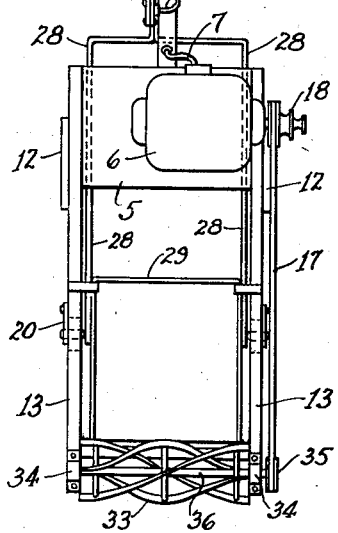
INVENTOR.
Joe Maga
BY Carlos G. Stratton
ATTORNEY.

Patented Nov. 5, 1940

2,220,342

UNITED STATES PATENT OFFICE 2,220,342

LAWN TOOL

Joe Maga, Los Angeles, Calif.

Application July 31, 1939, Serial No. 287,565

2 Claims. (Cl. 97—59)

My invention relates to lawn tools and more particularly to a tool that is power driven and by the interchanging of parts may be used for digging into a lawn or for cutting same.

An important object of the invention is to provide a single adjusting means for adjusting the digging tool or the lawn mower, whichever is utilized.

The invention also comprises novel details of construction and novel combinations and arrangements of parts, which will more fully appear in the course of the following description.

In the drawing, like reference characters designate similar parts in the several views.

Figure 1 is a side elevation, partly in section, showing an embodiment of my invention.

Figure 2 is an end elevation of said embodiment, partly in section.

Figure 3 is a plan view of the embodiment, but showing a lawn mower instead of a digging tool as in Figures 1 and 2.

Figure 4 is an enlarged section taken on the line 4—4 of Figure 1.

Referring more in detail to the drawing, a frame support 5 is provided for an electric motor 6. Wiring 7 for the motor extends up a hollow tongue 8 on the frame. An electric switch 9 is disposed on the tongue 8. Manuals 10 are provided at the end of the tongue 8. Ground wheels 12 are provided on the frame 5.

A forward extension 13 of the frame 5 rotatably supports a rotor 14 at the front end. Blades 15 are disposed radially and helically on the rotor 14. A sheave 16 on the rotor is connected to be driven by the motor 6 through the intermediary of a belt 17. Drive pulleys 18 of different size on the shaft of the motor may be used to drive the digger 14 faster or slower relative to the operation of the motor. A hood 19 is provided for the digger 14.

Swinging arms 20 on the frame extension 13 carry ground wheels 21. A series of apertures 22 on the frame extension 13 may be used to adjustably connect the arms 20 on the frame. The frame member 13 is upwardly inclined from the digging tool 14 up to the main portion of the frame 5.

An adjusting handle 23 for the wheels 21 is provided adjacent the manuals 10. A link 24 connects the handle 23 with another link 25. The link 25 is pivotally mounted on the tongue 8 by means of a clamp 26. The link 25 is in turn connected with a yoke 28. The bifurcations of the yoke 28 provide a space therebetween. The bifurcations of the yoke 28 are connected to swing the wheels 21 and their arms 20 about the axes of the bolt 38 by which the arms 20 are pivotally mounted on the frame 13.

A set screw 30 is arranged on the tongue 8 to maintain the link 24 in adjusted positions. A bracket 31 carries the set screw and permits same to bear against a side of the link 24. A U-shaped clamp 32 maintains the bracket 31 in position on the tongue 8.

In order to interchange a lawn mower 33 for the rotary digging tool 14, all that is necessary is to remove upper parts 34 of the rotor bearings, replace the rotary digger with the lawn mower, replace the bearing parts 34, and apply the belt 17 to a pulley 35 at the end of the lawn mower shaft 36. By this interchange, the single power means may be used either for digging or mowing the lawn.

The use of the present invention is believed obvious since turning on the switch 9 will cause operation of a motor 6, which in turn will operate either the digger or the lawn mower, whichever is applied to the frame. Vertical adjustment of the forward end of the frame is effected by the swinging motion of the arms 20 by means of the linkage connecting the arms with the handle 23.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a power driven lawn device, main supporting wheels, a frame on said wheels, having manual means for its operation including a rear handle, and also having a portion of the frame inclined downwardly and forwardly with regard to the manual means and forwardly beyond the supporting wheels, pivoted links adjustable lengthwise of, and depending from, the frame, wheels on the lower ends of said pivoted links, a lawn tool rotatably supported on the forward ends of said inclined portion of the frame, to be raised and lowered by swinging motion of the pivoted links underneath the inclined portion of the frame, and mechanism to effect said swinging motion of the pivoted links including a push and pull lever extending across, and adjustably clamped intermediate its ends to the handle bar.

2. In a power driven lawn device, a pair of main supporting wheels, a main frame on which said wheels are mounted, having side extensions projecting forwardly beyond the main wheels, a lawn tool rotatably supported by, and between, the forward ends of said extensions, a pair of links adjustably pivoted at their upper ends to, and depending from, said frame extensions intermediate the ends of the latter, ground wheels carried by the lower ends of said links, a handle member extending upwardly and rearwardly from the main frame, a pair of adjusting bars below the main frame, pivotally connected at their forward ends to the lower ends of said links for adjusting the latter to thereby raise and lower the frame extensions and the lawn tool thereof, and having offset rear end portions in parallel connected relation below a portion of the handle member, a rocking lever fulcrumed intermediate its ends on a portion of the handle member and having its lower end pivotally connected to the said rear ends of the adjusting bar, an adjusting lever pivotally connected at its forward end to the upper end of the rocking lever, and means for adjustably clamping said adjusting lever intermediate its ends to the handle member.

JOE MAGA.